United States Patent [19]

Heyden et al.

[11] 4,132,694

[45] Jan. 2, 1979

[54] METHOD FOR IMPROVING THE LATENT GLASS OF LATEX PAINTS

[75] Inventors: Rudi Heyden, Erkrath; Adolf Asbeck; Michael Eckelt, both of Dusseldorf; Wolfgang Gress, Wuppertal-Elberfeld, all of Fed. Rep. of Germany

[73] Assignee: Henkel Kommanditgesellschaft auf Aktien (Henkel KGaA), Dusseldorf, Fed. Rep. of Germany

[21] Appl. No.: 748,734

[22] Filed: Dec. 9, 1976

[30] Foreign Application Priority Data

Dec. 22, 1975 [DE] Fed. Rep. of Germany ....... 2557954

[51] Int. Cl.$^2$ ............................................. C08L 33/08
[52] U.S. Cl. ............................. 260/29.6 R; 106/271; 252/321; 252/358

[58] Field of Search ................ 106/271; 252/310, 311, 252/358, 321; 260/29.6 H, 29.6 R

[56] References Cited

U.S. PATENT DOCUMENTS

| | | | |
|---|---|---|---|
| 3,180,836 | 4/1965 | Jursich | 252/358 |
| 3,652,453 | 3/1972 | MacDonnell | 252/358 |
| 3,677,963 | 7/1972 | Lichtman et al. | 252/321 |
| 3,919,111 | 11/1975 | Heyden et al. | 252/358 |

Primary Examiner—Lorenzo B. Hayes
Attorney, Agent, or Firm—Hammond & Littell

[57] ABSTRACT

Method for improving the latent gloss of latex paints comprising incorporating therein liquid antifoam dispersions based on antifoam waxes containing a 1:1/2-3:1/2-4 molar ratio castor oil: ethylene oxide: propylene oxide adduct, which acts as fortifying agent for the first-mentioned wax.

10 Claims, No Drawings

METHOD FOR IMPROVING THE LATENT GLASS OF LATEX PAINTS

BACKGROUND OF THE INVENTION

Latex paints (pigmented aqueous dispersions of synthetic or natural resins) must contain additives which suppress the formation of foam during their manufacture and use. A principal effect of the additives is to cause rapid deaeration of the paint while the films are wet. It is only in this way that flawless coatings can be obtained which are completely free from foam and bubbles and which completely seal the painted surface. A similar situation exists in the case of oil paints.

The use of defoamers is of decisive importance in the production and use of high gloss latex paints, i.e., paints which provide films of lacquer-like appearance when dry. Latex paints of this type are produced by using resin latices (particularly polyacrylate latices) of very small particle size. Owing to their high content of emulsifying agent, these fine particle size latices readily form foam (particularly the so-called "micro-foam"). Micro-foams are composed of small air bubbles which are enclosed in the surface of the film and thus substantially decrease the glossiness of the film.

Polyadducts of ethylene and propylene oxide, fatty acid polyglycol esters, fatty acid partial esters of glycerine and other polyols such as pentaerythritol, and organopolysiloxanes are widely used as agents for preventing the formation of foam or for breaking foams which have formed. A disadvantage of these anti-foaming agents is their tendency to produce flawed coatings when the paints which have a content thereof are applied to surfaces. The agents impair the adhesiveness and the spreadability of the paint, particularly when the agents are organic silicon compounds. Furthermore, so-called "fish eyes" frequently form in the coatings. Furthermore, the antifoaming effect imparted by the agents is not always adequate.

Defoamers (fine dispersions of certain wax-like substances in an inert carrier liquid, for example, mineral oil) are frequently used to good effect in oil and latex paints. Hydroxystearyl behenate, hydroxystearyl stearate, and the esters of fatty acids with various polyalkylene glycols have given satisfactory results as defoaming agents and usually provide good to adequate results in most paints. However, these defoamers do not perform entirely satisfactorily in high-gloss paints, since they do not prevent formation of the microfoam and do not cause the microfoam to break before the paint has set.

OBJECTS OF THE INVENTION

One object of the invention is to discover an agent which will improve or fortify the antifoaming action of conventional waxy ester-type defoaming agents.

Another object of the invention is to discover such an agent which is inexpensive to manufacture and which is highly effective for the purpose.

THE INVENTION

The present invention is broadly based on the discovery that the antifoaming properties of dispersions of conventional wax defoamers in an organic liquid or in water are improved when the dispersions have a content of a 1:½– 3: ½–4 molar ratio castor oil: ethylene oxide: propylene oxide adduct is highly dispersed form. Preferably, the adducts of 1 mol of castor oil with 1 mol of ethylene oxide and 1 mol of propylene oxide are used.

We have also found that the antifoaming properties of mixtures of these agents are superior to equal weights of either of the groups of agents alone, so that evidently the invention rests on the discovery of a synergistic action.

We have additionally found that the antifoaming dispersions of the present invention can be manufactured and employed by conventional means, so that the invention does not require the use of any new technique.

More in detail, we have found that foam-suppressing dispersions wherein the fluid phase is an inert liquid and the dispersed phase is an antifoam wax is substantially improved in its effectiveness as antifoam agent when it contains in highly dispersed form a 1:½– 3:½–4 molar ratio castor oil: ethylene oxide: propylene oxide adduct. We have found that the adduct acts as fortifying agent for the antifoam wax i.e., that it interacts synergistically therewith. In comparative instances when the castor oil adduct has been added as replacement for part of the anti-foam wax in the manufacture of a latex paint, the specific gravity of a sample of the paint which has been subjected to a standard foam test has increased substantially, reflecting a substantial decrease in the amount of foam therein.

The anti-foam additives of the present invention are produced by reacting the desired quantities of ethylene oxide and propylene oxide with caster oil in a known manner, preferably in the presence of an alkali, i.e. sodium hydroxide and under pressure. The alkylene oxide reacts with the hydroxyl groups present in the castor oil forming polyether substituents. They may be added to all commercially available defoamer dispersions based on waxes (e.g. wax-like esters of fatty acids with fatty alcohols, containing a free hydroxyl group). They are particularly useful for improving the defoaming action of wax-like esters of hydroxystearyl alcohol with saturated fatty acids or with hydroxy fatty acids of $C_{16-22}$ chainlength (see German published specification No. 2,209,559), and of esters of hydroxystearic acid with fatty alcohols of $C_{16}$-$C_{22}$ chain length optionally combined with the diesters of $C_{16}$-$C_{22}$ fatty acids with polyethylene glycol. In particular, the formation of microfoam during the production and use of latex paints can be effectively prevented by the presence of the dispersions of the present invention. In particular, excellent results are obtained in the case of high-gloss latex paints, in that paint films are obtained which have lacquer-like gloss and which are completely free from bubbles.

The continuous phase of the dispersions of the present invention can be any inert material which is fluid at normal application temperature. Preferably it has a solidification point below 5° C. (so that it can be used in fluid form during normal weather conditions) and a boiling point above 70° C. (preferably above 140° C.) so that it can be used in connection with previously-known anti-foam agents which possess high melting points. Water is suitable in many instances as well as the higher melting alcohols and ketones, and esters (e.g. amyl butyrate) can be advantageously used. However, mineral oil is preferred because of its absence of odor and toxicity, because of its high boiling point and fluidity at low temperatures, and because of its ready availability.

The total amount of antifoam components in the antifoam dispersion should be limited so that the viscosity of the dispersion at normal application temperature (20° C.) is in the fluid range. This depends on the viscosity of the continuous phase and the particle size of the dispersed phase. In general, the total amount of the combined antifoam components is from 10% to 60% of the total weight of the dispersion.

The previously-known antifoam agents and the castor oil adduct are present in the dispersion in weight ratio between 1:20 and 2:1. The best synergistic action which has so far been observed occurs when the castor oil adduct and the other antifoam components are present in the ratio of about 1:10 by weight.

The dispersions of the present invention can be prepared by mixing the two antifoaming components with the carrier or mixture of carriers (which can be an emulsion) with vigorous agitation so as to reduce the antifoaming components to adequately fine and preferably to colloidal particle size. Adequate reduction in particle size can be effected by passing the mixture through a homogenizer at a temperature above the melting point of the agents therein and then rapidly chilling the product to prevent formation of aggregates. The particles are of colloidal dimensions and the dispersions do not separate into layers when stored for two weeks at room temperature. When diluted to 1% solids the dispersions exhibit a blue colloidal haze when viewed by direct light and they exhibit the Tyndall effect when viewed by transmitted light.

With a conventional antifoam wax dispersion the active ingredient (antifoam wax) is present in an amount from 5% to 25% by weight of dispersion. The castor oil adduct additive of the present invention amounts to 10 to 100, preferably 20 to 50 percent by weight based on the weight of the dispersion containing the antifoam wax.

The dispersions of the present invention can be advantageously added to all aqueous and organic fluids which foam during handling so long as the pH of its fluids is not so low or so high as to decompose (i.e., to hydrolyze) either of the agents. They can be advantageously added to fluids having a pH in the range of 2 to 12 when they are needed for only a brief suppression of foam, and can be safely added to fluids having a pH in the range about 5 to 9, which are normally held in storage before use.

The invention is further described by the examples which follow. These examples are best embodiments of the invention and are not be construed in limitation thereof. Parts are by weight except when otherwise stated.

EXAMPLE 1

The following illustrates the comparative foaming properties of a gloss latex paint containing a defoamer of the prior art, the paint wherein about half the defoamer has been replaced by the castor oil adduct according to the present invention, and the paint wherein the castor oil adduct itself is the defoamer.

The following constituents were mixed one after the other in a Dissolver. Parts and percentages are by weight unless otherwise stated.

Paint

| Component | Parts |
| --- | --- |
| Propylene glycol | 104.2 |
| Polyacrylate solution, 24% visc. at 25° C. 1000–1500 P | 8.7 |
| Ammonia, conc. | 2.2 |
| Defoamer: 7% hydroxystearyl behenate  3% distearic ester of polyalkylene | |

-continued

| Component | Parts |
| --- | --- |
| glycol (made by reacting 35 mols each of ethylene and propylene oxides with 1 mol of glycol) dispersed in mineral oil | 10.0 |
| Titanium dioxide pigment | 218.3 |
| 2,2,4-Trimethyl-3-hydroxypentyl isobutyrate | 20.9 |
| Preservative | 1.7 |
| Polyacrylate dispersion, 46%–47% aqueous; visc. at 25° C. approximately 1000 cP | 583.6 |
| Formaldehyde, 30% aqueous | 3.5 |
| Ammonium polyacrylate solution 22% aqueous | 6.1 |
| Water | 39.8 |
| Total | 999.0 |

Paint B

The above preparation was repeated except that 4 parts by weight of the defoamer dispersion were replaced by 4 parts by weight of the 1:1:1 castor oil: propylene oxide: ethylene oxide defoamer adduct.

Paint C

This paint was prepared in the same manner as paint A, except that all of the defoamer was replaced with 10 parts of the castor oil adduct used for the preparation of paint B.

The foaming behavior of all three paints was tested immediately after each paint had been formed in the Dissolver as follows.

In each instance 80 parts of the paint was mixed with 20 parts of water and agitated in a Dissolver (diameter of the dispersion disc = 40 mm.) for 1 minute at 2,000 r.p.m. and 1 minute at 3,000 r.p.m. 50 ml. of the product was then removed and weighed. The greater the weight of the sample, the lower is its content of air and, consequently, the better is the defoaming action of the defoamer used. Results are shown below.

EXAMPLE 2

Each paint was also tested by application to a surface. The latex paint, diluted with water in the ratio 80:20, was agitated in a Dissolver for 1 minute at 2,000 r.p.m.

The smooth side of pieces of hard fiberboard (20 × 30 × 0.4 cm.) were sealed by applying a resin latex (diluted in the ratio 1:1) by means of a brush. When the surfaces were dry, 60-70 g. of the paint, after being stirred in the Dissolver, where then applied to the piece of hard fiberboard and were uniformly distributed by means of a foam roller such that 15 g. of wet paint (corresponding to 250 g/m$^2$) remained on the hard fiberboard.

The foam roller had a width of 6 cm. and a diameter of 7 cm. It was made of open-pore polyurethane foam. When a roller of this type is used, additional air is incorporated in the coating in the same manner as occurs, to a lesser extent, when the coating is applied by means of a brush.

The coatings of the resulting painted board were evaluated for gloss, and the results are shown in the following table. The rating of 1 indicates that the coating had a very large number of flaws caused by air bubbles. The rating of 6 indicates that the coating dried completely without air bubbles.

| Paint | Weight of 50 ml. (grams) | Increase* g. | Increase* % | Bubble Rating |
|---|---|---|---|---|
| Control | 39.2 | | | 1 |
| A | 50.4 | 11.2 | 28.6 | 2 |
| B | 57.0 | 17.8 | 45.5 | 6 |
| C | 50.6 | 11.4 | 29.2 | 3 |

*Over the control.

Only the coating produced by paint B was completely free from air bubbles when dry. In the case of paints A and C, the surface gloss was destroyed by microfoam. It will be seen that the weight of the sample of 50 ml. paint B was about 50% in excess of the weight of the 50 ml. sample of paint A and paint C even though the weight of antifoam agent in each paint sample was the same. Paint B therefore contained considerably less entrapped air.

EXAMPLE 3

A second gloss latex paint (Paint D) was prepared as follows. The following materials were added in the order stated to a Dissolver. Parts are by weight.

| Component | | Parts |
|---|---|---|
| Propylene glycol | | 104.2 |
| Polyacrylate solution, 25% aqueous; visc. at 25° C. =1000-1500 cP | | 8.6 |
| Ammonia, conc. | | 2.0 |
| Defoamer: 7% hydroxystearyl behenate 3% distearic ester of polyalkylene glycol (made by reacting 35 mols each of ethylene and propylene oxides with 1 mol of glycol) dispersed in mineral oil | | 10.0 |
| Titanium dioxide pigment | | 214.0 |
| Preservative | | 1.8 |
| 2,2,4-Trimethyl-3-hydroxypentyl isobutyrate | | 20.7 |
| Polyacrylate dispersion, 46%–47% aqueous visc. at 25° C. approx. 1000 cP (pH 9.2) | | 591.0 |
| Formaldehyde, 30% aqueous | | 3.4 |
| Ammonium polyacrylate, 22% aq. solution | | 2.8 |
| Wter | | 41.5 |
| Total | | 1,000.0 |

PAINT E

The procedure for the preparation of paint D was repeated except that 4 parts of the defoamer dispersion were replaced with 4 parts of the castor oil adduct used in the preparation of paint B.

Paint F

The procedure for the preparation of paint D was repeated, except that all of the defoamer was replaced by 10 parts of the castor oil adduct used for the preparation of paint B.

The paints were tested by the method described in Example 1

The films obtained with paints D and F were not glossy because of the air bubbles present. The film obtained with paint E was a lacquered surface virtually free from bubbles.

| Paint | Weight of 50 ml. (grams) | Incr. g. | Incr. % | Bubble Rating |
|---|---|---|---|---|
| Control | 38.7 | | | 1 |
| D | 50.8 | 12.1 | 31.3 | 2–3 |
| E | 58.2 | 19.5 | 50.5 | 5 |

-continued

| Paint | Weight of 50 ml. (grams) | Incr. g. | Incr. % | Bubble Rating |
|---|---|---|---|---|
| F | 51.2 | 12.5 | 32.4 | 2 |

The weight of paint E was thus about 55% in excess of the weight of either of paints D and F, although each of the paints contained the same weight of anti-foam agent, showing that paint E contained substantially less air.

EXAMPLE 4

Production of a Defoamer Dispersion 900 parts by weight of a mineral oil ($D_{15}O = 0.889$, $\eta 20° = 16.0$ cSt, pour point at $-49°$ C.) were heated to 90° C. in an open heatable mixer with a high-speed agitator. At this temperature, 70 parts by weight of hydroxystearyl monobehenate and 30 parts by weight of distearic ester of polyalkylene glycol (35 mols of ethylene oxide and 35 mols of propylene oxide) were stirred in. After all the additions were clearly dissolved, the product was stirred rapidly until it was cold. A finely divided dispersion was obtained. 60 parts by weight of this dispersion were mixed with 40 parts by weight of the 1:1:1 castor oil: propylene oxide:ethylene oxide adduct. The resulting product was a stable, finely divided dispersion with excellent defoaming properties.

We claim:

1. A method of improving the latent gloss property of gloss latex paint, which comprises uniformly distributing in said paint an effective amount of an agent for inhibiting the formation of bubbles in said paint when said paint is applied to a surface, said agent comprising a fluid dispersion wherein the continuous phase is an inert organic liquid or water and the dispersed phase is a mixture of (A) a wax-like ester selected from the group consisting of esters of hydroxystearyl alcohol with saturated fatty acids or with hydroxy fatty acids of $C_{16-22}$ chain length, and of hydroxystearic acid with fatty alcohols of $C_{16-22}$ chain length, and a mixture thereof with the diesters of $C_{16}$-$C_{22}$ fatty acids with polyethylene glycol, and (B) and effective fortifying amount therefor of a $1:\frac{1}{2}$–$3:\frac{1}{2}$–4 molar ratio castor oil: ethylene oxide: propylene oxide adduct; the particles of said dispersed phase being of colloidal dimensions, and the weight ratio between (A) and (B) being between 1:20 and 2:1.

2. The method of claim 1 wherein the continuous phase is mineral oil.

3. The method of claim 2 wherein the mineral oil has a boiling point about 140° C.

4. The method of claim 1 wherein the continuous phase is water.

5. The method of claim 1 wherein the weight ratio between (A) and (B) is between 1:4 and 2:1.

6. The method of claim 1 wherein said adduct is a 1:1:1 molar ratio adduct.

7. The method of claim 1 wherein said wax-like ester is an ester selected from the group consisting of (1) an ester of hydroxystearyl alcohol with a $C_{16-22}$ saturated fatty acid and (2) an ester of hydroxystearyl alcohol with a $C_{16-22}$ saturated hydroxy fatty acid.

8. The method of claim 1 wherein said weight ratio is about 1:10.

9. The method of claim 1 wherein said adduct is present in an amount of from 10 to 100 percent by weight based on the weight of the dispersion of the wax-like ester.

10. The method of claim 1 wherein the paint is a high-gloss latex paint.

* * * * *